(12) United States Patent
Ge et al.

(10) Patent No.: US 11,624,848 B2
(45) Date of Patent: Apr. 11, 2023

(54) UNDERWATER ACOUSTIC TEST SYSTEM AND METHOD

(71) Applicant: Nanjing University of Information Science & Technology, Nanjing (CN)

(72) Inventors: Junxiang Ge, Nanjing (CN); Jie Wang, Nanjing (CN); Hai Lin, Nanjing (CN)

(73) Assignee: Nanjing University of Information Science & Technology, Nanjing (CN)

( * ) Notice: Subject to any disclaimer, the term of this patent is extended or adjusted under 35 U.S.C. 154(b) by 276 days.

(21) Appl. No.: 17/122,863

(22) Filed: Dec. 15, 2020

(65) Prior Publication Data

US 2021/0215839 A1  Jul. 15, 2021

(30) Foreign Application Priority Data

May 29, 2020  (CN) .......................... 202010482827.6

(51) Int. Cl.
*G01V 1/18*  (2006.01)

(52) U.S. Cl.
CPC ........ *G01V 1/186* (2013.01); *G01V 2210/144* (2013.01)

(58) Field of Classification Search
CPC .. G01V 1/186; G01V 2210/144; G01S 7/539; G01S 7/521; G01S 7/52004
See application file for complete search history.

(56) References Cited

U.S. PATENT DOCUMENTS

| | | | |
|---|---|---|---|
| 2018/0224535 A1* | 8/2018 | Sankar | G01S 17/88 |
| 2019/0154439 A1* | 5/2019 | Binder | G01B 11/26 |
| 2019/0182415 A1* | 6/2019 | Sivan | G06F 3/013 |
| 2020/0076457 A1* | 3/2020 | Urzhumov | H01Q 1/36 |
| 2020/0294401 A1* | 9/2020 | Kerecsen | G05D 1/0287 |

* cited by examiner

*Primary Examiner* — Daniel L Murphy
*Assistant Examiner* — Amie M Ndure
(74) *Attorney, Agent, or Firm* — CBM Patent Consulting, LLC

(57) ABSTRACT

The underwater acoustic test system comprises an underwater acoustic transmitting unit, an underwater acoustic parabolic reflector, an underwater acoustic receiving unit, an orientation control system, and a computer measurement and control system. The underwater acoustic transmitting unit comprises an underwater acoustic signal generator and a transmitting transducer. The underwater acoustic parabolic reflector comprises a central main reflecting area and an edge diffraction processing area, wherein the central main reflecting area is configured for reflecting acoustic wave signals, and the edge diffraction processing area is configured for reducing the influence of the underwater acoustic parabolic reflector on a test area. The underwater acoustic receiving unit comprises a receiving transducer and an underwater acoustic signal receiver. The orientation control system comprises a traveling crane and a test turntable.

9 Claims, 4 Drawing Sheets

UNDERWATER ACOUSTIC TEST SYSTEM AND METHOD

This application claims priority to Chinese Patent Application Ser. No. CN202010482827.6 filed on 29 May 2020.

TECHNICAL FIELD

The present invention relates to the field of testing of acoustic characteristics of targets, and particularly relates to an underwater acoustic test system and method.

BACKGROUND

Sonars are the most commonly used and effective non-contact detection equipment in underwater detection technology. In the civilian field, sonars have been widely used in fish school detection, seabed resource exploration, archaeological discovery, etc. With the development of high-performance sonar detection technology, the test of the acoustic scattering of underwater targets and the test of the directivity of large-size (array) transducers have become the key point of underwater acoustic study.

Whether it is the test of target characteristics of the sonar of a detection system or the test of the performance of a wireless transmitter or receiver (e.g., an antenna or a transducer), the distance R between the tested target and a testing transmitter should be greater than a minimum test distance Rmin (far-field condition) so as to obtain uniform plane waves at the tested target. That is:

$$R > R_{min} = 2\frac{D^2}{\lambda},$$

wherein D is the size of the tested target, and $\lambda$ is the wavelength of electromagnetic waves or acoustic waves. However, when the geometric dimensions of the tested target are large or the testing wavelength is short, the required test distance often can hardly be met by an indoor test environment.

In a study on the acoustic scattering of an underwater target or the design of a large-size (array) transducer, the experimental test of the underwater target is the most common technical means. For the test of the acoustic scattering of an underwater large-size target made of a completely or nearly completely rigid material, the "scaling" theory can be employed to carry out a target scaling test. That is, the transmitting frequency of a sonar can be increased in an equal proportion according to the proportion of reduction of the tested target. At this point, the acoustic scattering characteristics of the underwater target obtained by scaled target measurement are consistent with the acoustic scattering characteristics of the real target. However, when the tested target is not completely or nearly completely rigid, the aforementioned "scaling" will not exist. The test of the acoustic scattering of the underwater target must be carried out adopting a target with the same size, which is often very difficult for a test in an indoor pool with limited size. The reason is that for a large underwater target or high-frequency characteristic test, the indoor pool can hardly provide a test distance meeting the "far-field condition".

In fact, the same problem also exists in the test of the electromagnetic scattering of a large target and the test of a large-diameter (array) antenna. In order to solve this problem, since 1950s, new near-field electromagnetic wave test methods have been studied, and corresponding scientific research instruments and equipment have been developed. They mainly include: a near-field scanning test method and equipment, a compact-field test method and equipment, etc. Among them, the compact-field test method and equipment are widely adopted in the design of electromagnetic scattering characteristics of large targets, the development of large-diameter (array) antennas, the evaluation of the detection capability of novel radars and other tests due to high test precision, short test time, low construction cost, high stability, strong confidentiality and other advantages.

To sum up, there is a need for a new method capable of testing the underwater acoustic characteristics of a large target in a short distance in an indoor pool, which can "shorten" the shortest test distance required by the "far-field condition" by tens or even hundreds of times.

SUMMARY

Objective of the Invention

The present invention provides an underwater acoustic test method and system, which can solve the problem on how to test the underwater acoustic scattering of a large underwater target and a large-size (array) acoustic wave transducer in a short distance indoors.

Technical Solution

The present invention provides an underwater acoustic test system, which includes an underwater acoustic transmitting unit, an underwater acoustic parabolic reflector, an underwater acoustic receiving unit, an orientation control system, and a computer measurement and control system; the underwater acoustic transmitting unit includes an underwater acoustic signal generator and a transmitting transducer, wherein the underwater acoustic signal generator is configured for generating tested electric acoustic wave signals, and the transmitting transducer is configured for transmitting acoustic wave signals converted from the electric acoustic wave signals generated by the underwater acoustic signal generator; the underwater acoustic parabolic reflector includes a central main reflecting area and an edge diffraction processing area, wherein the central main reflecting area is configured for reflecting acoustic wave signals, and the edge diffraction processing area is configured for reducing the influence of the underwater acoustic parabolic reflector on a test area; the underwater acoustic receiving unit includes a receiving transducer and an underwater acoustic signal receiver, wherein the receiving transducer is configured for receiving and converting scattered acoustic wave signals into electric acoustic wave signals during the measurement of the acoustic scattering of a target, and the underwater acoustic signal receiver is configured for processing the electric acoustic wave signals received and converted by the receiving transducer; the orientation control system includes a traveling crane and a test turntable, wherein the traveling crane is configured for controlling the position of a tested target, and the test turntable is configured for controlling the angle of the tested target; and the computer measurement and control system is configured for controlling the test system to operate according to a sequence and processing and displaying test data.

Preferably, the underwater acoustic parabolic reflector is of a paraboloid structure.

Preferably, the underwater acoustic parabolic reflector adopts a three-layered structure formed by tightly combining a wave-ward surface resin board, a resin interlayer honeycomb structure and a back resin board.

Preferably, the material of the underwater acoustic parabolic reflector is a resin material with wave impedance approximating underwater acoustic wave impedance.

Preferably, the structure of the resin interlayer hollow honeycomb board is a hexagonal, quadrangular or cylindrical honeycomb structure.

Preferably, the transmitting transducer and the receiving transducer are installed at the focus of the underwater acoustic parabolic reflector.

Preferably, the edge diffraction processing area is of a periodic sawtooth structure.

The present invention also provides an underwater acoustic test method. The method is a method for testing the underwater acoustic scattering of a large target, and includes the following steps:

(1) controlling the underwater acoustic signal generator by the computer measurement and control system to generate electric acoustic wave signals with specific frequency and waveform, which are then amplified by an acoustic wave power amplifier and transmitted to the transmitting transducer, and converting the electric signals into underwater acoustic signals and transmitting the underwater acoustic signals by the transmitting transducer;

(2) converting the underwater acoustic signals transmitted by the transmitting transducer into plane acoustic waves after reflecting them through the underwater acoustic parabolic reflector, wherein the plane acoustic waves are propagated onto a tested target to produce scattered acoustic waves;

(3) receiving part of the scattered acoustic waves by the receiving transducer after reflecting them through the underwater acoustic parabolic reflector to generate electric acoustic wave signals, which are transmitted to the underwater acoustic signal receiver after being amplified by the power amplifier;

(4) sampling the electric acoustic wave signals by the underwater acoustic signal receiver to generate digital signals, which are transmitted to the computer measurement and control system, and obtaining acoustic scattering signals of the tested target at a specific angle;

(5) controlling the angle of the tested target by the computer measurement and control system through the test turntable, repeating steps (1) to (4), and thereby obtaining acoustic scattering signals of the tested target within the range of 360°;

(6) calibrating the underwater acoustic scattering signals of the tested target with a standard object to eliminate errors, thereby obtaining the underwater acoustic scattering of the tested target.

The present invention also provides an underwater acoustic test method. The method a method for testing the directivity of an acoustic wave transducer, and includes the following specific steps:

S1: controlling the underwater acoustic signal generator by the computer measurement and control system to generate electric acoustic wave signals with specific frequency and waveform, which are then amplified by an acoustic wave power amplifier and transmitted to the transmitting transducer, and converting the electric signals into underwater acoustic signals and transmitting the underwater acoustic signals by the transmitting transducer;

S2: generating plane acoustic waves from the underwater acoustic signals transmitted by the transmitting transducer after reflecting them through the underwater acoustic parabolic reflector, wherein the tested transducer receives the plane acoustic waves;

S3: after receiving the plane acoustic waves, converting the plane acoustic waves by the tested transducer into electric acoustic wave signals and transmitting the electric acoustic wave signals to the underwater acoustic signal receiver;

S4: sampling the electric acoustic wave signals by the underwater acoustic signal receiver to generate digital signals, which are transmitted to the computer measurement and control system, and obtaining the acoustic wave signal strength of the tested transducer at a specific angle;

S5: controlling the angle of the tested transducer by the computer measurement and control system through the test turntable, repeating steps S1 to S4, and thereby obtaining the signal strength of the tested target within the range of 360°;

S6: calibrating the acoustic signal strength of the tested acoustic wave transducer with a standard transducer to eliminate errors, thereby obtaining the directivity of the tested transducer.

Advantages

Compared with the prior art, the advantages of the present invention are as follows: (1) the present invention can generate in a short distance a "far-field condition" for plane waves which can meet the test of acoustic characteristics of a large target in water, and can shorten the far-field test distance by tens or even hundreds of times, and thereby the underwater acoustic scattering of a large target and the directivity of a large-size (array) transducer can be tested in an indoor pool; (2) the underwater acoustic compact-field test system of the present invention not only can greatly decrease the requirement of a test on the construction of a reflection-free pool and reduce the construction cost of an indoor pool, but also can effectively broaden the existing testing frequency band of underwater acoustic pools and the size range of targets, and can further increase the efficiency, stability and confidentiality of a test.

DETAILED DESCRIPTION

In order for those skilled in the art to understand and implement the present invention, the present invention will be further described in detail below with reference to the drawings.

Figure 1:
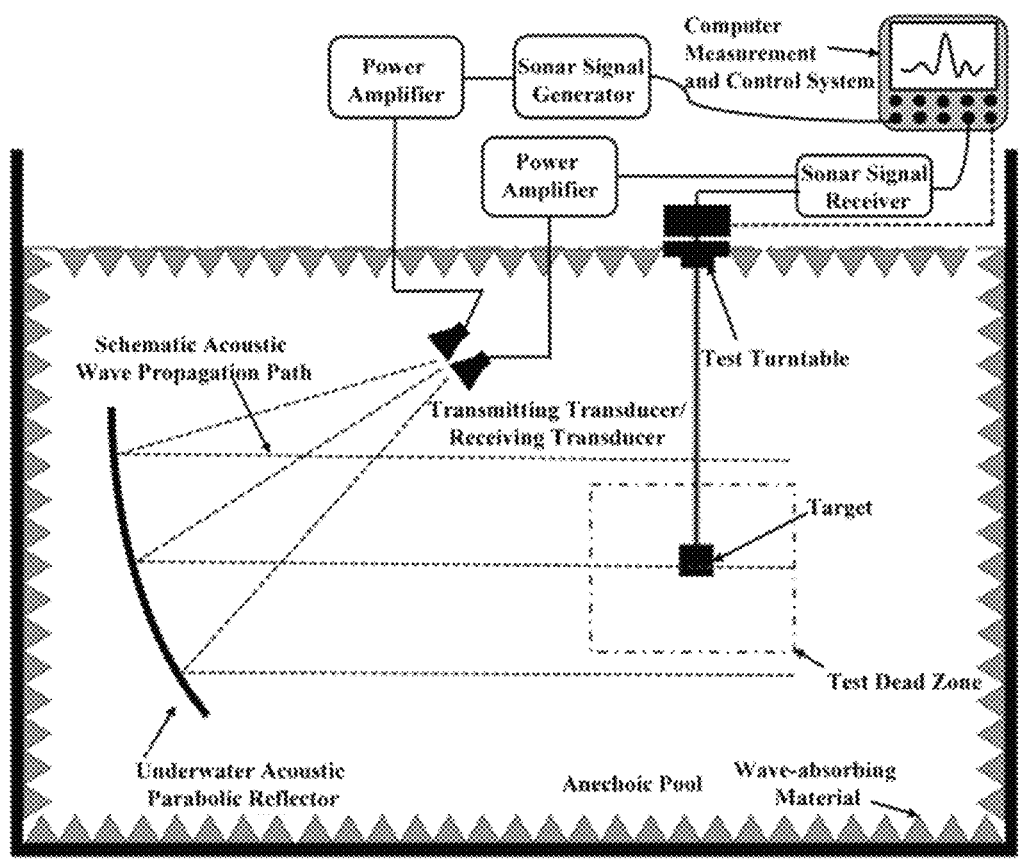
FIG. 1 depicts a schematic diagram of an underwater acoustic compact-field test system.

As shown in FIG. 1, an underwater acoustic test system includes an underwater acoustic transmitting unit, an underwater acoustic parabolic reflector, an underwater acoustic receiving unit, an orientation control system, and a computer measurement and control system.

The underwater acoustic transmitting unit includes an underwater acoustic signal generator and a transmitting transducer, wherein the underwater acoustic signal generator is configured for generating tested electric acoustic wave signals, and the transmitting transducer is configured for transmitting acoustic wave signals converted from the electric acoustic wave signals generated by the underwater acoustic signal generator.

The underwater acoustic parabolic reflector includes a central main reflecting area and an edge diffraction processing area, wherein the central main reflecting area is configured for reflecting acoustic wave signals, and the edge diffraction processing area is configured for reducing the influence of the underwater acoustic parabolic reflector on a test area.

The underwater acoustic receiving unit includes a receiving transducer and an underwater acoustic signal receiver, wherein the receiving transducer is configured for receiving and converting scattered acoustic wave signals into electric acoustic wave signals during the measurement of the acoustic scattering of a target, and the underwater acoustic signal receiver is configured for processing the electric acoustic wave signals received and converted by the receiving transducer.

The orientation control system includes a traveling crane and a test turntable, wherein the traveling crane is configured for controlling the position of a tested target, and the test turntable is configured for controlling the angle of the tested target.

The computer measurement and control system is configured for controlling the test system to operate according to a sequence and processing and displaying test data.

During the test of the underwater acoustic scattering of a target, the tested target is installed at the 'target' in FIG. 1; and during the test of the directivity of an acoustic wave transducer, the tested acoustic wave transducer is installed at the 'target' in FIG. 1.

The underwater acoustic parabolic reflector, the transmitting transducer, the receiving transducer and the tested target are located in an anechoic pool; the power amplifier, the underwater acoustic signal receiver, the underwater acoustic signal generator and the computer measurement and control system are located in the air environment outside the pool; and the traveling crane and the test turntable are located on a horizontal plane.

The underwater acoustic parabolic reflector is of a paraboloid structure, and the transmitting transducer and the receiving transducer are located at the focal position of the paraboloid. Because of the unique properties of the paraboloid, within a short spatial distance, the spherical acoustic waves transmitted by the transmitting transducer are converted into plane acoustic waves with approximately equal amplitude and the same phase under the function of the underwater acoustic parabolic reflector. Likewise, during the measurement of the acoustic scattering of a target, the underwater acoustic parabolic reflector can concentrate part of scattered acoustic wave energy to the position of the receiving transducer. Therefore, under the function of the underwater acoustic parabolic reflector, an underwater acoustic compact field can generate in a short distance a "far-field condition" for plane waves which can meet the test of the acoustic characteristics of a large target in water, the far-field test distance can be shortened by tens or even hundreds of times, and thereby the acoustic scattering of a large target and the directivity of an array transducer can be tested in an indoor pool. Therefore, the underwater acoustic parabolic reflector is also referred to as an underwater acoustic compact field, and the test system is also referred to as an underwater acoustic compact field test system.

Figure 2:
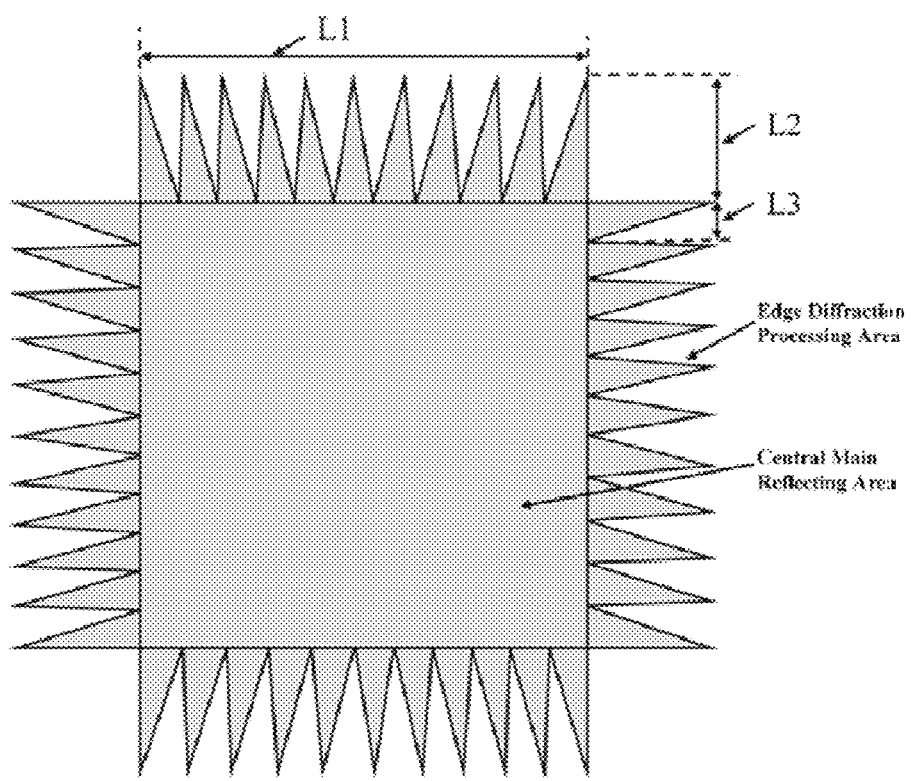
FIG. 2 depicts a front structural view of an underwater acoustic parabolic reflector.

FIG. 2 depicts a front structural view of the underwater acoustic parabolic reflector, in which the central main reflecting area is square with a width L1 of 4 m, and the edge diffraction processing area is 0.5 m in length L2 and 0.4 m in width L3.

In order to illustrate the underwater acoustic parabolic reflector more generally, in combination with the lowest frequency of acoustic waves used in practice, in a design, the central main reflecting area L1 should be 20 times larger than the wavelength of the lowest frequency of acoustic waves used, and the sawtooth length L2 of the edge diffraction processing area should be 3 to 5 times the wavelength of the lowest frequency of acoustic waves used.

Figure 3:
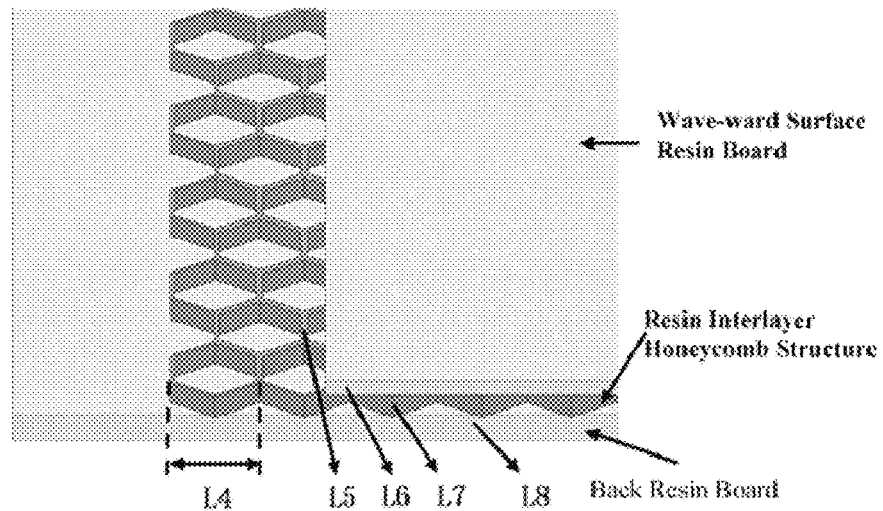
FIG. 3 depicts a sectional diagram of the structure of the underwater acoustic parabolic reflector.

FIG. 3 depicts a sectional diagram of the structure of the underwater acoustic parabolic reflector, and the underwater acoustic parabolic reflector adopts a tight three-layered structure formed by tightly combining a wave-ward surface resin board, a resin interlayer honeycomb structure and a back resin board. A resin material with wave impedance approximating underwater acoustic wave impedance should be chosen as the resin material used by the underwater acoustic parabolic reflector. The structure of the interlayer hollow honeycomb board is a hexagonal, quadrangular or cylindrical honeycomb structure. The thickness L6 of the wave-ward surface resin board is 1 cm, and the thickness L7 of the resin interlayer honeycomb structure is 1 cm. The honeycomb wall thickness L5 of the resin interlayer honeycomb structure is 0.4 mm. The honeycomb size is L4, preferably 5 cm. Because the back resin board has to bear part of structural mechanics, its thickness L8 is preferably 2 cm. The tight structure of the underwater acoustic parabolic reflector formed by tightly combining the wave-ward surface resin board, the resin interlayer honeycomb structure and the back resin board can achieve high acoustic wave reflectivity.

Figure 4:
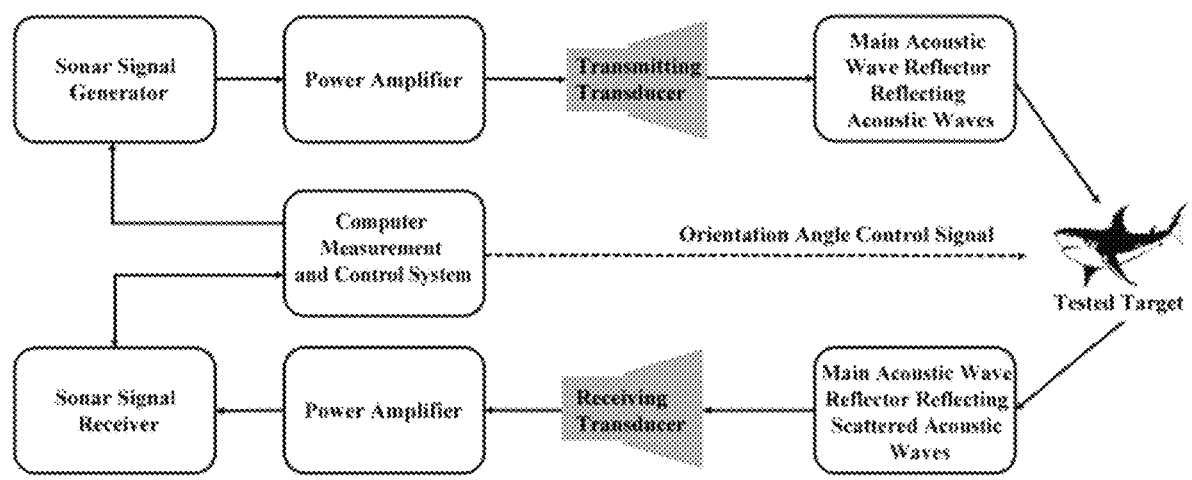
FIG. 4 depicts a flow chart of the underwater acoustic compact-field test system testing the acoustic scattering of a target.

The present invention provides an underwater acoustic test method, specifically a method for testing the underwater acoustic scattering of a large target, which includes the following steps, as shown in FIG. 4:

Step 1: controlling the underwater acoustic signal generator by the computer measurement and control system to generate electric acoustic wave signals with specific frequency and waveform, which are then amplified by an acoustic wave power amplifier and transmitted to the transmitting transducer, and converting the electric signals into underwater acoustic signals and transmitting the underwater acoustic signals by the transmitting transducer;

Step 2: converting the underwater acoustic signals transmitted by the transmitting transducer into plane acoustic waves after reflecting them through the underwater acoustic parabolic reflector, wherein the plane acoustic waves are propagated onto a tested target to produce scattered acoustic waves;

Step 3: receiving part of the scattered acoustic waves by the receiving transducer after reflecting them through the underwater acoustic parabolic reflector to generate electric acoustic wave signals, which are transmitted to the underwater acoustic signal receiver after being amplified by the power amplifier;

Step 4: sampling the electric acoustic wave signals by the underwater acoustic signal receiver to generate digital signals, which are transmitted to the computer measurement and control system, and obtaining acoustic scattering signals of the tested target at a specific angle;

Step 5: controlling the angle of the tested target by the computer measurement and control system through the test turntable, repeating Steps 1 to 4, and thereby obtaining acoustic scattering signals of the tested target within the range of 360° $I_{S1}$;

Step 6: calibrating the acoustic scattering signals of the tested target with a standard object $I_{SS}$, thereby obtaining the acoustic scattering of the tested target $\delta_{SS}$ according to an electromagnetic scattering value of the standard object $\delta_{S1} = \delta_{SS} + I_{S1} - I_{SS}$.

Figure 5:
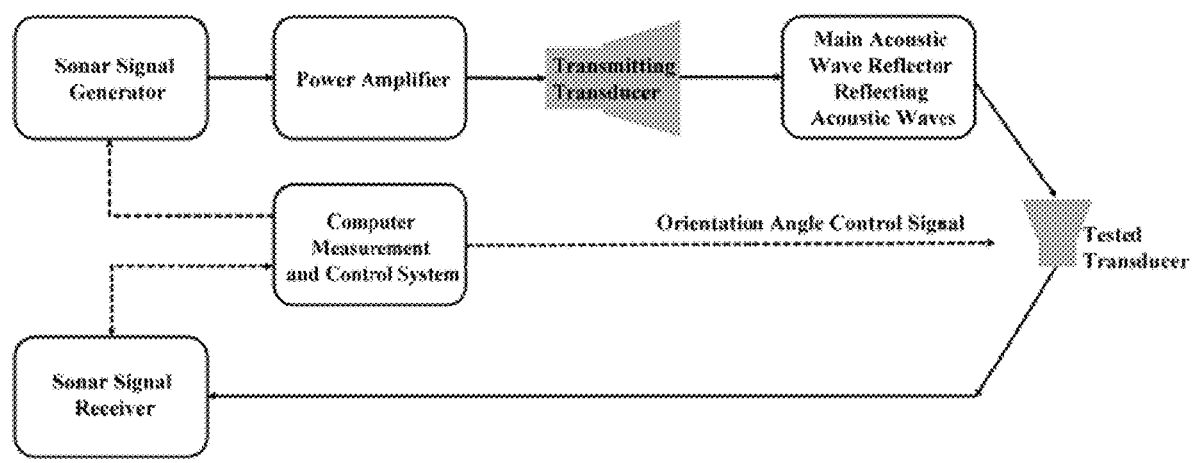
FIG. 5 depicts a flow chart of the underwater acoustic compact-field test system testing the directivity of an acoustic wave transducer.

The present invention also provides a method for testing the directivity of an acoustic wave transducer, which includes the following specific steps, as shown in FIG. 5:

Step 1: controlling the underwater acoustic signal generator by the computer measurement and control system to generate electric acoustic wave signals with specific frequency and waveform, which are then amplified by an acoustic wave power amplifier and transmitted to the transmitting transducer, and converting the electric signals into underwater acoustic signals and transmitting the underwater acoustic signals by the transmitting transducer;

Step 2: generating plane acoustic waves from the underwater acoustic signals transmitted by the transmitting transducer after reflecting them through the underwater acoustic parabolic reflector, wherein the tested transducer receives the plane acoustic waves;

Step 3: after receiving the plane acoustic waves, converting the plane acoustic waves by the tested transducer into electric acoustic wave signals and transmitting the electric acoustic wave signals to the underwater acoustic signal receiver;

Step 4: sampling the electric acoustic wave signals by the underwater acoustic signal receiver to generate digital signals, which are transmitted to the computer measurement and control system, and obtaining the acoustic wave signal strength of the tested transducer at a specific angle;

Step 5: controlling the angle of the tested transducer by the computer measurement and control system through the test turntable, repeating Steps 1 to 4, and thereby obtaining the signal strength of the tested target within the range of 360° $I_{R1}$;

Step 6: calibrating the acoustic signal strength $I_{RS}$ of the tested acoustic wave transducer a standard transducer to eliminate errors, thereby obtaining the directivity $R_{R1} = R_{RS} + I_{R1} - I_{RS}$ of the tested transducer, wherein $R_{RS}$ is a known quantity, which is the gain of the standard transducer.

It should be pointed out that during the test of the directivity of the acoustic wave transducer, only the transmitting transducer needs to be installed at the focal position of the underwater acoustic parabolic reflector.

The content above is the further detailed description of the present invention in combination with the specific preferred embodiments, and it cannot be considered that the specific embodiments of the present invention are limited to this. For those of ordinary skill in the art to which the present invention belongs, a plurality of substitutions can also be made without departing from the concept of the present invention, and should all be regarded as belonging to the protection scope of the present invention determined by the submitted claims.

What is claimed is:

1. An underwater acoustic test system, wherein the underwater acoustic test system comprises an underwater acoustic transmitting unit, an underwater acoustic parabolic reflector, an underwater acoustic receiving unit, an orientation control system, and a computer measurement and control system; the underwater acoustic transmitting unit comprises an underwater acoustic signal generator and a transmitting transducer, wherein the underwater acoustic signal generator is configured for generating tested electric acoustic wave signals, and the transmitting transducer is configured for transmitting acoustic wave signals converted from the electric acoustic wave signals generated by the underwater acoustic signal generator; the underwater acoustic parabolic reflector comprises a central main reflecting area and an edge diffraction processing area, wherein the central main reflecting area is configured for reflecting acoustic wave signals, and the edge diffraction processing area is configured for reducing the influence of the underwater acoustic parabolic reflector on a test area; the underwater acoustic receiving unit comprises a receiving transducer and an underwater acoustic signal receiver, wherein the receiving transducer is configured for receiving and converting scattered acoustic wave signals into electric acoustic wave signals during the measurement of the acoustic scattering of an underwater target, and the underwater acoustic signal receiver is configured for processing the electric acoustic wave signals received and converted by the receiving transducer; the orientation control system comprises a traveling crane and a test turntable, wherein the traveling crane is configured for controlling the position of a tested target, and the test turntable is configured for controlling the angle of the tested target; and the computer measurement and control system is configured for controlling the test system to operate according to a sequence and processing and displaying test data.

2. The underwater acoustic test system of claim 1, wherein the underwater acoustic parabolic reflector is of a paraboloid structure.

3. The underwater acoustic test system of claim 1, wherein the underwater acoustic parabolic reflector adopts a three-layered structure formed by tightly combining a waveward surface resin board, a resin interlayer honeycomb structure and a back resin board.

4. The underwater acoustic test system of claim 1, wherein the material of the underwater acoustic parabolic reflector is a resin material with wave impedance approximating underwater acoustic wave impedance.

5. The underwater acoustic test system of claim 3, wherein the structure of the resin interlayer hollow honeycomb board is a hexagonal, quadrangular or cylindrical honeycomb structure.

6. The underwater acoustic test system of claim 1, wherein the transmitting transducer and the receiving transducer are installed at the focus of the underwater acoustic parabolic reflector.

7. The underwater acoustic test system of claim 1, wherein the edge diffraction processing area is of a periodic sawtooth structure.

8. An underwater acoustic test method adopting the system of claim 1, wherein the method is a method for testing the acoustic scattering of an underwater target, and is characterized by comprising the following steps:

(1) controlling the underwater acoustic signal generator by the computer measurement and control system to generate electric acoustic wave signals with specific frequency and waveform, which are then amplified by an acoustic wave power amplifier and transmitted to the transmitting transducer, and converting the electric signals into underwater acoustic signals and transmitting the underwater acoustic signals by the transmitting transducer;

(2) converting the underwater acoustic signals transmitted by the transmitting transducer into plane acoustic waves after reflecting them through the underwater acoustic parabolic reflector, wherein the plane acoustic waves are propagated onto a tested target to produce scattered acoustic waves;

(3) receiving part of the scattered acoustic waves by the receiving transducer after reflecting them through the underwater acoustic parabolic reflector to generate electric acoustic wave signals, which are transmitted to the underwater acoustic signal receiver after being amplified by the power amplifier;

(4) sampling the electric acoustic wave signals by the underwater acoustic signal receiver to generate digital signals, which are transmitted to the computer measurement and control system, and obtaining acoustic scattering signals of the tested target at a specific angle;

(5) controlling the angle of the tested target by the computer measurement and control system through the test turntable, repeating steps (1) to (4), and thereby obtaining acoustic scattering signals of the tested target within the range of 360°;

(6) calibrating the acoustic scattering signals of the tested target with a standard object to eliminate errors, thereby obtaining the acoustic scattering of the tested target.

9. An underwater acoustic test method adopting the system of claim 1, wherein the method is a method for testing the directivity of an acoustic wave transducer, and is characterized by comprising the following specific steps:

S1: controlling the underwater acoustic signal generator by the computer measurement and control system to generate electric acoustic wave signals with specific frequency and waveform, which are then amplified by an acoustic wave power amplifier and transmitted to the transmitting transducer, and converting the electric signals into underwater acoustic signals and transmitting the underwater acoustic signals by the transmitting transducer;

S2: generating plane acoustic waves from the underwater acoustic signals transmitted by the transmitting transducer after reflecting them through the underwater acoustic parabolic reflector, wherein the tested transducer receives the plane acoustic waves;

S3: after receiving the plane acoustic waves, converting the plane acoustic waves by the tested transducer into electric acoustic wave signals and transmitting the electric acoustic wave signals to the underwater acoustic signal receiver;

S4: sampling the electric acoustic wave signals by the underwater acoustic signal receiver to generate digital signals, which are transmitted to the computer measurement and control system, and obtaining the acoustic wave signal strength of the tested transducer at a specific angle;

S5: controlling the angle of the tested transducer by the computer measurement and control system through the test turntable, repeating steps S1 to S4, and thereby obtaining the signal strength of the tested target within the range of 360°;

S6: calibrating the acoustic signal strength of the tested acoustic wave transducer with a standard transducer to eliminate errors, thereby obtaining the directivity of the tested transducer.

\* \* \* \* \*